Feb. 14, 1956  G. S. KNOX  2,734,714
VALVE
Filed May 16, 1950  8 Sheets-Sheet 1

GRANVILLE S. KNOX,
INVENTOR.

BY
Barkalow & Scantlebury
ATTORNEYS.

Feb. 14, 1956  G. S. KNOX  2,734,714
VALVE

Filed May 16, 1950  8 Sheets-Sheet 5

GRANVILLE S. KNOX,
INVENTOR.

BY
Barksdale & Scantlebury
ATTORNEYS.

Feb. 14, 1956 G. S. KNOX 2,734,714
VALVE
Filed May 16, 1950 8 Sheets-Sheet 6

GRANVILLE S. KNOX,
INVENTOR.

BY
Barksdale & Scarlsbury
ATTORNEYS.

Feb. 14, 1956 — G. S. KNOX — 2,734,714
VALVE
Filed May 16, 1950 — 8 Sheets-Sheet 7

GRANVILLE S. KNOX,
INVENTOR.

BY
Barkelew & Scantlebury
ATTORNEYS.

Feb. 14, 1956 G. S. KNOX 2,734,714
VALVE
Filed May 16, 1950 8 Sheets-Sheet 8

GRANVILLE S. KNOX,
INVENTOR.

BY
Batchelor & Scantlebury
ATTORNEYS.

United States Patent Office 2,734,714
Patented Feb. 14, 1956

2,734,714
VALVE

Granville S. Knox, Los Angeles, Calif., assignor to Hydril Corporation, Los Angeles, Calif., a corporation of California Application May 16, 1950, Serial No. 162,311

9 Claims. (Cl. 251—171)

This invention has to do generally with valves, and is more particularly directed to a novel valve wherein the final seal between the stopper member and the opposing body member is accomplished by pressurizing a coherent body of internally tenacious plastic material extending from member to member.

As a matter of definition to be applied hereinafter, by the terminology "coherent body of internally tenacious plastic material" or by the shorter terminology "plastic material," I mean a body of plastic material which flows under pressure with relatively great resistance to loss of internal bond between particles, and which acts in the manner of a fluid in the transmission of pressure. For instance, within the defined terminology I include natural or synthetic rubber or internally bonded or vulcanized fibrous material, as distinguished from semi-solids such as heavy grease or putty.

The plastic material is contained in a cavity or groove provided within one or both of the members, the cavity having a mouth adapted to oppose the other member when the stopper is in orifice-blanking position. After the stopper is in such position, means is provided whereby the plastic is controllably pressurized, the portion occupying the mouth being thus forcibly pressed against the said other member in a manner to form a fluid tight seal, even though the pressure of the valved fluid be extremely high.

Not only does the described arrangement have the advantageous effect of providing a seal which will hold, without the slightest seepage, against any internal fluid pressure which the valve body will stand, but it eliminates the need for ground, metal sealing faces, and functions with full satisfaction even though the opposed metal surfaces of the stopper and body members become scored or otherwise facially damaged. When applied to valves of the gate type, the gate may be parallel-walled instead of tapered and, since there is clearance around the gate in its directions of operative movement even when the valve is fully closed, foreign matter is thrust aside as the gate moves to and from its seat, rather than gathering in pockets which might otherwise interfere with full-closure or full-opening.

The stopper is bodily movable substantially completely, and, in some of the illustrated variations, completely, to and from orifice blanking position while the plastic material is under no substantial effective pressure, thus rendering it relatively easy to accomplish this bodily movement and to avoid or, at least, greatly reduce wear on the plastic material as it traverses the opposing face.

Preferably, though not necessarily, continuous actuation of a single control member in a single given direction sequentially moves the stopper bodily and controls the pressurization of the sealing medium. That is, assuming the valve is open, the first movement of the control or actuating member shifts the valve stopper into a position blanking a flow-line orifice, and then continued actuation of said member (and the actuating movement may be of the same type throughout) accomplishes the effective pressurization of the sealing medium. On the other hand, when the actuating member is reversely operated, the pressure on the sealing medium is first relieved and then the stopper is moved bodily out of orifice-blanking position.

The cavity containing the extrudable sealing medium may be provided either in the stopper of the valve or in the stopper-opposing surface, or in both, as will appear from embodiments hereinafter illustrated and described. Also the invention may be applied to valves of different types. For instance, I have shown it embodied both in sliding-gate and rotary-plug types.

One of the major features of the invention has to do with the following considerations. The aforementioned mouth of the cavity or groove has a portion which, as the stopper traverses the flow passage during operation of the valve, is exposed to a pressure zone within the body. The fluid pressure within this zone may be relatively high or relatively low. If, now, another portion of the mouth is exposed to a pressure zone in which the fluid pressure differs from that of the first zone, the effect of the pressure differential is to cause, or tend to cause, displacement of the plastic sealing medium from the cavity into the relatively low pressure zone.

If the pressure differential is sufficiently great, substantially the entire body of sealing material may be extruded from the cavity into the relatively low pressure zone. The extent of extrusion, with given pressure differential and given time of exposure to that differential pressure, will, of course, depend upon such considerations as the flow characteristics of the plastic material, the size of the cavity mouth and the strength of the bond (if a bond be provided) between the plastic material and the cavity walls.

Any appreciable extrusion of sealing medium into such a low pressure zone may render the valve entirely inoperative or, at least, greatly decrease its efficiency, for obviously there is no way of returning the extruded material to the cavity. Even though the extent of extrusion may be relatively slight, the effect may be damaging. For instance, in certain embodiments of the invention, as the stopper continues its movement to or from closed position, the extruded portion would be sheared off by or jambed between the relatively moving valve body and stopper were it not for the preventative means I employ. In any event, there would be a loss of a certain amount of the sealing material.

It is therefor a major object of the invention to provide a valve of the pressurized plastic seal type, wherein the sealing medium is never exposed to differential pressure conditions which would otherwise cause the plastic material to be harmfully extruded.

The situation is complicated by the fact that, in a given valve, a zone of, for instance, relatively high pressure when the flow through the valve is in a given direction, becomes a relatively low pressure zone when the flow is in the opposite direction. And, when the valve is manufactured, the relative direction of flow through the line in which that particular valve is to be installed, is not always known. Accordingly, to adapt the valve for universal installation, the structure is preferably so fashioned that harmful simultaneous exposure of the plastic material to differential pressure zones is prevented irrespective of the direction of fluid flow.

How all the above is accomplished will be better understood from the following detailed description, wherein other objects and features will be made apparent. Reference will be had to the accompanying drawings, wherein.

First describing the embodiment of my valve illustrated in Figs. 1 to 7, the body is generally indicated at 10, being made up of main body portion 11, cover portion 12, bonnet 13 and bonnet-cap 14. Cover 12 is in the form of a disk 15 removably fitted in the circular opening 16 of portion 11, with a flange 17 overlying the top face of said portion and bolted thereto at 18. A gasket 19 provides a seal between the body portion and cap.

Figures 1, 2, 3, 4, 5:
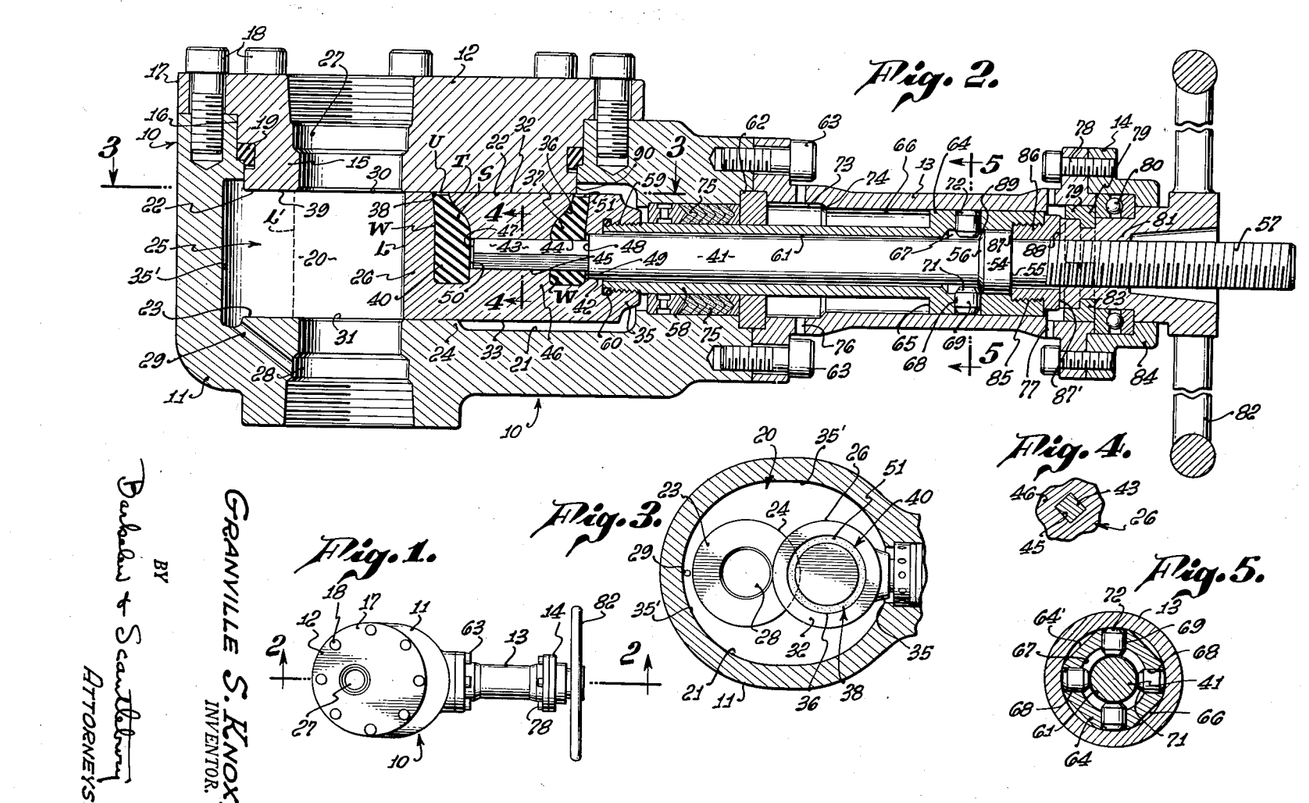
Fig. 1 is a top plan view of a valve embodying my invention.
Fig. 2 is an enlarged section on line 2—2 of Fig. 1.
Fig. 3 is a reduced-scale, fragmentary section on line 3—3 of Fig. 2.
Fig. 4 is a fragmentary section on line 4—4 of Fig. 2.
Fig. 5 is a detail section on line 5—5 of Fig. 2.

Valve chamber 20 within body 10 is, in part, vertically defined by lower wall 21 and the under face 22 of cover 12, said under face 22 and the upper face 23 of bottom-wall-boss 24 being parallel and defining a horizontal way 25 for the reception, with sliding fit, of the reciprocable valve stopper member 26 which is here shown in the form of a blade or "spool." Cover 12 and wall 21 have alined flow line passages 27 and 28, respectively, opening into chamber 20 when stopper 26 is in the retracted position of Fig. 2; a by-pass 29 connecting chamber 20 and the passage 28 for a purpose to be described. The ports or valve-chamber-facing orifices of passages 27 and 28 are indicated at 30 and 31, respectively.

As will later appear, the annular area 39 on surface 22, which area surrounds orifice 30, functions as a sealing surface. It is also to be noted that while surface 23 is provided on a boss which is integral with main body portion 11 and surface 22 is provided on removable cover portion 12, these surfaces are to be considered broadly as provided within the body 10, it making no difference as to manner in which they are associated with individual body members so long as they are carried thereby in proper relative arrangement both with regard to each other and to stopper 26; and the appended claims are intended to be read with such reservations in mind.

Stopper 26 is in the form of a relatively thick, rigid, disk having parallel top and bottom faces 32 and 33, respectively, and provided with a radial, tubular boss 35, though its circular contour as viewed in plan (Fig. 3) is not at all to be considered as limitative. Still as viewed in plan, there is provided clearance between the stopper and the vertically extending walls 35' of body member 11 in all positions to which the stopper may be reciprocated by the means to be described.

The vertical extent of way 25, defined by faces 22 and 23, is predetermined to provide for sliding fit of stopper 26, but it is not necessary that any opposed surfaces of the body member and the stopper be ground smooth, since the final sealing of the closed valve is accomplished by pressurally engaging certain of said surfaces with a plastic sealing medium which adapts itself to surface irregularities.

Stopper 26 is fabricated with an annular cavity or groove 36 which is preferably relatively wide at its central portion 37 and narrows as it approaches the top of the stopper, forming an annular throat T and an annular mouth or opening 38, concentric with the stopper and opening to its external surface 32. The inside diameter of annular mouth 38 is such, that, when the stopper blanks port 30 as in Figs. 6 and 7, said mouth is adapted to oppose annular sealing area 39 on surface 22, and the mouth fully encircles port 30 and, in turn, is fully blanked by area 39.

The cavity 36 is substantially filled with a coherent body 40 of extrudable, internally tenacious plastic material such as rubber, natural or synthetic, or internally bonded or vulcanized fibrous material such as is used in packing valve stems. Preferably, though not necessarily, the plastic material should be resilient. I have found, for instance, that a synthetic rubber such as "Hycar" of a durometer hardness of 50 to 55, is particularly well suited to the purpose. From this point on, the description will treat of the material 40 as though it were resilient, but it will be understood that this is not limitative on the appended claims except for those which require the characteristic of resiliency.

It will be noted that the inward swell S of the material 40 beneath throat T forms a "key," spaced below mouth 38, which holds the material 40 against bodily dislodgment from cavity 36.

Material 40 may be molded in place within cavity 36 and may, in some situations, be bonded to the stopper members, as by vulcanizing it in whole or in part to the cavity-defining walls W. The material 40, in unpressurized condition, extends up through throat T and either to the plane of stopper face 32 (Fig. 8) or to a point slightly below that plane (Fig. 2). In the preferred embodiment, material 40, when in unstressed condition is, as shown in Fig. 2, spaced slightly below face 32, as at U, but it will be understood that this is not limitative on such claims as do not specifically call for this feature. The spacing U is of advantage in that it allows a limited amount of displacement of material 40 through throat T without engaging that material with face 22, thus allowing limited movement of the pressurizing means (to be described) without setting the plastic seal, which limited movement may occur prior to the time seal-setting is desired. Furthermore, when the material 40 is resilient and is keyed or bonded (or both) to the stopper 26, the space U forces the stretching of the resilient packing material 40 in order for it to reach the face 22 (Fig. 7), it resulting that when the pressurizing and stretching forces are relieved prior to the reopening of the valve, the extruded plastic material has a reaction tendency to snap back through space U and thus clear of face 22.

Controllable means, to be described, is provided for pressurizing the plastic when the stopper is in orifice blanking position. Since the flowable material 40 transmits pressure effects substantially as does a liquid, it is necessary to apply pressure to only one portion of the confined mass to raise the pressure of the entire mass. However, in order to more quickly and evenly distribute the full effective pressure entirely about the annulus, I have provided means for simultaneously applying the pressure to the mass at spaced points, the areas of applied pressure being substantially equal. I will therefore describe means for imposing equal pressure simultaneously to plastic 40 at spaced-apart points, but this is not to be considered as limitative on such claims as do not specify this characteristic.

The pressure applying means comprises a plunger 41 slidable through radial bore 42 in stopper 26, said bore opening to the near side of cavity 36. The plunger has an integral extension 43 of square cross section, which is adapted to slide through the complementary ways 44 and 45 (Fig. 4) provided, respectively, in the plastic body 40 and the central portion 46 of stopper 26, said central portion defining the inner wall of cavity 36. The noncircular characteristics of extension 43 and way 45 prevent relative rotation between the stopper 26 and sleeve 58 on the one hand and plunger 41 on the other hand. Thus, since the way 25 prevents rotation of stopper 26 with respect to body 10, plunger 41 is held against rotation with respect to said body. Way 45 opens to cavity 36 so the square end 47 of extension 43 is in facial opposition to the inner peripheral wall of the plastic annulus 40 at a point in radial alinement with the point at which the shoulder 48, formed at the junction of the major diameter of plunger 41 and the extension 43, facially opposes the outer peripheral wall of that annulus. The effective pressure area of end 47 is substantially equal to that of shoulder 48, and the spacing between said end and said shoulder is such that when the plunger is moved to the left from the position of Fig. 2, said end and said shoulder will simultaneously engage the plastic 40 and will have equal pressural effects thereon. Thus the pressure throughout the mass of plastic 40 is quickly equalized in spite of its described "semi-solid" characteristics.

In the position of Fig. 2, when the plastic is under no applied pressure, it will be noted that gaps 49 and 50, of equal axial extent, exist between the plastic annulus and pressure areas 47 and 48. It will also be noted that, in this figure, the upper surface 51 of the plastic within mouth 38, is spaced slightly below the upper surface 32 of the stopper, for reasons previously specified. Merely by way of example, in a mechanism having the characteristics and proportions of Fig. 2 and wherein the flow passages 27 and 28 represent openings about 2" in diameter, the axial extent of clearance gaps 49 and 50 may each be about 1/16" and the clearance gap U between surfaces 51 and 22 may be about 5/64", though, because of the scale of the drawing, these clearances are shown somewhat exaggerated in extent.

Plunger or rod 41 has an integral thrust collar 54 intermediate its ends, said collar presenting square-cut shoulder 55 and conical shoulder 56, the last named shoulder serving, at times, as a detent cam, as will be described. The free extremity of the rod is threaded at 57, the threads preferably being left-handed.

Sleeve 58 is threaded at 59 into a counterbore in stopper-hub 35, the sleeve and hub preferably being packed off at 60, all whereby the stopper 26 and sleeve 58 are, in effect, integral. Rod 41 is freely slidable, within established limits, through the sleeve bore 61. A stop ring 62 is clamped by bolts 63 between body portion 11 and bonnet 13, this ring also serving as a guide for sleeve 58 during its axial movement.

Figures 6, 7, 8, 9:
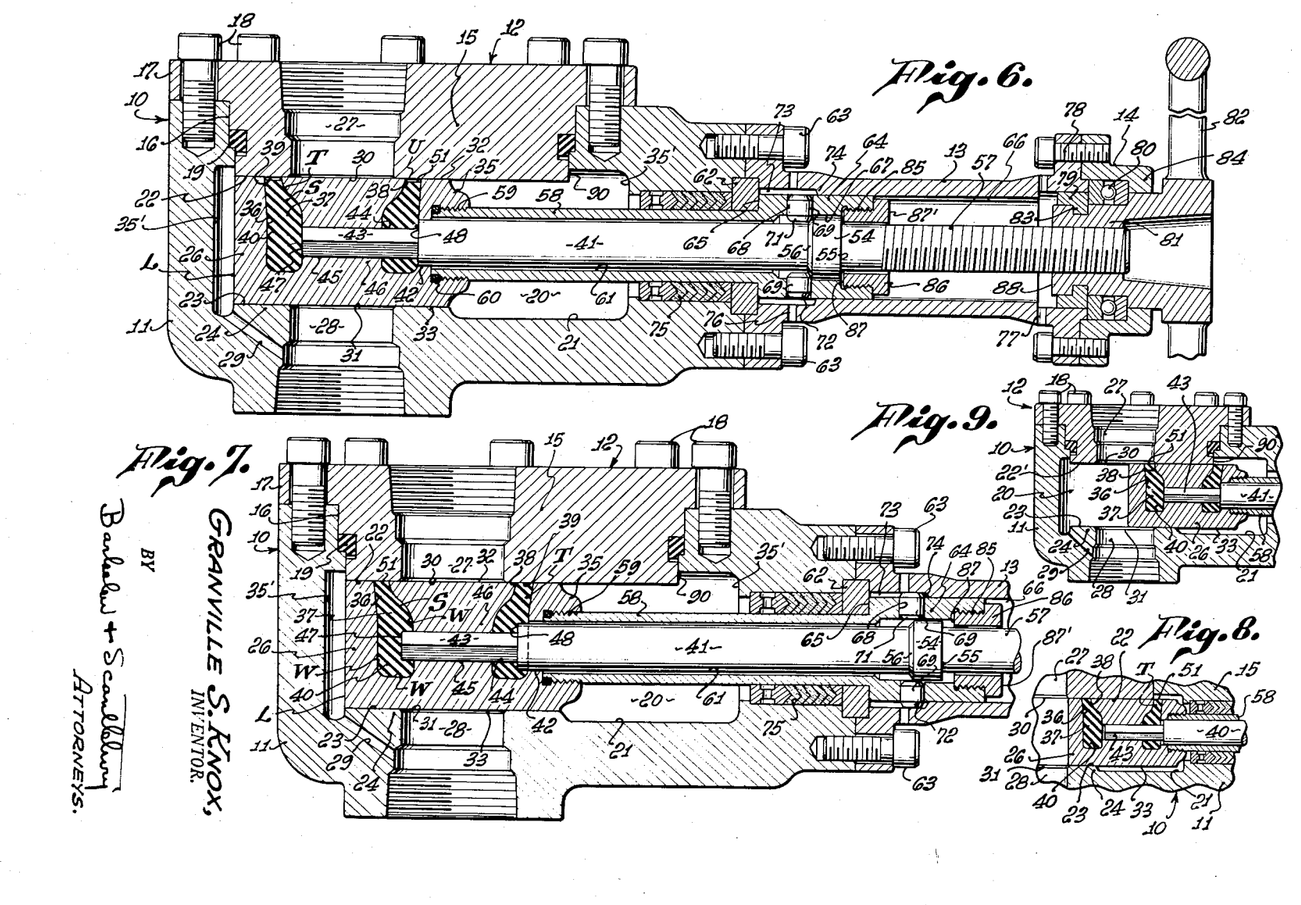
Fig. 6 is a view similar to Fig. 2 but showing the valve stopper in a different position.
Fig. 7 is a view similar to Fig. 2 but showing the valve completely closed and sealed-off.
Fig. 8 is a fragmentary section, on reduced scale, of a stopper member in the position of Fig. 2, but wherein the plastic packing material is shown flush with the upper face of said stopper member.
Fig. 9 is a fragmentary section, on reduced scale, of a detail variation wherein the proportionate lengths of the stopper spool and the overlying blanking wall of the housing are varied over the showing in Fig. 2, the stopper, however, being shown in intermediate position.

Sleeve 58 has an enlarged terminal portion or tubular head 64, preferably provided with wrench-taking face 64' (Fig. 5) which enlargement presents a shoulder 65 adapted to engage ring 62 to limit the left-wise movement of the sleeve 58 and stopper 26 (Figs. 6 and 7). The enlargement 64 is adapted to slide through bonnet bore 66, and is provided with a counterbore 67 through which collar 54 is adapted to have endwise play during certain stages of operation. As will appear, the rod 41 and sleeve 58 act together, at times, to serve as a composite valve stem, that is, they act jointly to shift stopper 26 to and from orifice-closing position. At other times they are adapted to have relative axial movement.

Extending radially through the wall of enlargement 64 and located to the left of collar 54 are detent ways or sockets 68 (Figs. 2 and 5) in which the cylindrical detents 69 are, at times, adapted to play radially with respect to sleeve 58. The opposite ends of each detent are conical, as at 71 and 72, the tapers 71 at the inner ends of the detents being substantially complementary to the taper of collar-shoulder 56. The detents are shown in the positions they would occupy were the sleeve 58 to extend vertically, it thus being unnecessary to illustrate the gravity effect on said detents, an effect which plays no part in the essential operative movements of the device.

Head 64 has a second counterbore 85 which is threaded to receive tubular nut 86, the nut presenting its inner end 87 as a shoulder in facial opposition to collar-shoulder 55. Nut 86 permits easy assembly and disassembly of the stopper 26 and sleeve 58 with the collared plunger 41.

Bonnet 13 is counterbored at 73, the shoulder 74 at the right hand end of the counterbore being tapered substantially complementarily with respect to the taper of the outermost detent-ends 72.

Sleeve 58 and body portion 11 are packed off by a packing assembly 75 so there may be no leakage from valve chamber 20 around the stem to bonnet bore 66 and thence to the atmosphere. If, in spite of this precaution, there should be slight leakage into said bore, relief ports 76 and 77 will drain the bore and thus eliminate the undesirable effects of fluid-trapping. Because of previously described structure, there can be no leakage from valve chamber 20 to the bonnet bore through the annular clearance between rod 41 and sleeve 58.

Bonnet cap 14 is bolted to the bonnet at 78, and, with the bonnet and split locking ring 79, positions ball bearing 80 and hub 81 of hand wheel 82. In other words, the hub is mounted for free rotation with respect to the bonnet and cap but is held by the flange 83 of ring 79 and the cap flange 84, against axial movement. Hub 81 is, in effect, a nut, for its bore is internally threaded to take the left hand screw threads 57 on rod 41. It will be seen that right hand rotation of wheel 82 will feed rod 41 to the left in Fig. 2, while reverse rotation will draw the rod to the right.

The operation of the valve will first be described without detailed mention of the effects of flow-line pressure. In Fig. 2 the valve is shown as fully open, the right-wise movement of stopper 26 having been limited by engagement of nut shoulder 87' with the internal shoulder 88 of hub 81, and there having been a space 89 developed between collar-shoulder 56 and detents 69 by virtue of the last-previous valve-opening operation.

The entire extents of cavity mouth or channel 38 and the material-surface 51, except for the portions lying to the right of housing shoulder 90, are covered by housing face 22. As wheel 82 is rotated right-handedly, the reaction on left hand threads 57 shifts rod 41 to the left with respect to sleeve 58 until shoulder 56 engages detents 69. This relative movement causes a reduction in the extents of gaps 49 and 50 but does not effectively pressurize material 40. Since detents 69 are, at this time, restrained by bonnet 13 against outward radial displacement, continued leftwise movement of rod 41 acts through collar 54 and detents 69 to thrust sleeve 58 and stopper 26 bodily to the left, causing said stopper to traverse ports 30 and 31. It will be noted that before the leading portions of cavity mouth 38 and the material-surface 51, therein, reach port 30, the portion of said mouth which previously lay to the right of housing-shoulder 90 will have become blanked by surface 22.

The left-wise movement of the stopper continues until sleeve-shoulder 65 engages stop ring 62, at which time stopper 26 is brought to rest in such position that mouth 38 and its contained material 40 fully encircle port 30 and, preferably, are somewhat annularly spaced therefrom (Fig. 6). With the parts in the positions of Fig. 6, the outer ends 72 of detents 69 register with counterbore 73 at the left of bonnet shoulder 74, it following that, during continued movement of rod 41 to the left with respect to sleeve 58, thrust-collar shoulder 56 acts against detent ends 71 to cam said detents radially outward into counterbore 73, thus, in effect, unlatching the sleeve from the rod.

Under certain conditions, the frictional resistance to movement between parts may be such that collar shoulder 56 starts to cam detents 69 into counterbore 73 the instant the detent-ends 72 register with housing-shoulder 74. In this event, at the end of the unlatching movement there will still be slight space between shoulder 65 and stop ring 62, and continued leftwise movement of rod 51 acts through the material 40 to move the stopper leftwise until such movement is positively stopped by engagement of the shoulder with the stop ring. During the unlatching movement of detents 69 and during stopper movement after completion of the unlatching operation, there may be sufficient relative axial movement of the stopper and rod 41 to tend to displace or pressurize material 40, but the relative movement is of slight order and is insufficient to pressurally engage the material 40 with face 22. Of course the original gaps 49 and 50 may be of an extent which allows for the unlatching operation before rod shoulders 47 and 48 engage material 40, or the extent of gap U may be such that appreciable relative movement between the stopper 26 and rod 41 may occur before material 40 is extruded sufficiently to pressurally engage face 22.

After leftwise movement of stopper 26 is positively checked by stop ring 62, continued leftwise movement of rod 41 through actuation of wheel 82, plunges the rod into plastic body 40, as in Fig. 7, pressurizing the material and, if the gap U still exists, extruding the material through said gap. In any event, the material is pressurized by rod-movement to an extent which pressurally engages it with face 22, thus forming an annular, fluid-tight, pressurized, plastic seal about port 30 and between the body 10 and stopper 26, preventing leakage through the valve, irrespective of the flow direction of the controlled fluid. If the flow is upwardly through passageway 28, the fluid pressure aids in maintaining a tight seal; if the flow is in the opposite direction, face 23 acts as a back-up or stop preventing the fluid pressure or the pressure of material 40 from forcing stopper 26 away from face 22.

The specified tenaciously coherent characteristics of the plastic prevents any appreciable or harmful extrusion of that material between surfaces 22 and 32 should there be a slight gap opened between said surfaces due to working clearance existing between stopper 26 and vertically spaced defining walls of way 25. In any event, the tenaciousness of the plastic effectively resists such rupture of the internal bond as might otherwise permit said extruded portions of the material from becoming detached from the main body of the plastic either at the time of extrusion or during subsequent operation of the valve.

It will be seen that face 51 of plastic material 40 will, within reasonable limits, sealingly adapt itself to surface 22 irrespective of irregularities of that surface and therefore said surface need not be ground or maintained smooth in order to insure a leak-tight closure. Similarly, the plastic material will effect a seal in spite of grit or sand which may be lodged on or imbedded in surface 22, thus adapting the valve for use in handling sandy or gritty fluids such as are often encountered in the lines of oil well drilling equipment. Pitting of the surface 22, such as may occur where corrosive fluids are being controlled, is not at all harmful, since plastic material 40 will accommodate itself to the pits. It is also apparent that since the stopper 26 does not move, or, in any event, moves but little, after material 40 is in engagement with face 22, said material is normally subject to little or no wear. However, such wear as may occur has no damaging effect, for plunger 41 is then merely further projected into material 40 to compensate for the wear and to continue a fluid-tight pressural seal.

Referring particularly to Fig. 3, it will be seen that, in all its positions of adjustment, stopper 26 is clear of all vertical defining walls 35′ of chamber 20, and, particularly, that when the valve is fully closed (Fig. 7) the leading edge L of the stopper is horizontally spaced from the opposed defining wall. It follows that as the stopper is advanced from the position of Fig. 2 to that of Fig. 7, its leading edge L pushes foreign matter which may lie on faces 22 and 23 into such portions of the chamber 20 as will insure that such matter does not interfere with full valve-closure. During retractive movement of stopper 26, foreign matter cannot be trapped in sufficient quantity between said stopper spool and walls 35′ to prevent full valve-opening.

It is also to be noted that by-pass 29 prevents such trapping of fluid within chamber 20 as might otherwise interfere with full closure of the valve. As stopper 26 moves from the position of Fig. 2 toward that of Fig. 7, the volumetric capacity of chamber 20 for fluid reception is progressively reduced by the entry of sleeve 58 to that chamber, and, were there no proper relief, the fluid trapped in the chamber as soon as the leading edge reached the position of L′ (Fig. 2) would prevent further leftwise movement of stopper 26. With the provision of by-pass 29, however, an amount of fluid corresponding to the displacement volume of sleeve 58 finds relief through that by-pass to passage 28.

I will now describe the opening of the valve and will follow by a discussion of certain critical conditions existing during the opening operation. Starting with the valve in the fully closed and sealing condition of Fig. 7, left hand rotation of wheel 82 acts through left-hand threads 57 to move plunger 41 to the right from the position of Fig. 7 to that of Fig. 6, except that detents 69 will still be in the positions of Fig. 7. This plunger-retraction depressurizes material 40, which material, due to its resiliency, returns to the condition of Fig. 6, disengaging material-face 51 from sealing face 22 and re-developing the gap U. Up to this time, of course, stopper 26 remains stationarily in the position of Fig. 7, it following that by the time the stopper subsequently starts to move there is assurance that there will be no sliding wear of material 40 where it is presented at mouth 38.

As soon as rod-shoulder 55 engages nut-shoulder 87, continued retractive movement of plunger 41 shifts stopper 26 to the right, housing-shoulder 74 camming detents 69 radially inwardly to the positions of Fig. 2 and thus, in effect, re-latching rod 41 and sleeve 58 for a subsequent re-closing operation. Retractive movement of plunger 41 continues to shift stopper 26 to the right until nut-shoulder 87′ engages hub-shoulder 88, whereupon the stopper comes to rest and the valve is restored to the fully open condition of Fig. 2.

In connection with the following discussion of pressure effects, etc. certain terms will be used which I wish preliminarily to define. The stopper 26 is to be considered as in "port blanking position" whenever it extends completely across port 30, irrespective of the extent to which its leading edge L overlaps face 22 at the "far" side (the left hand side in the several figures) of port 30. Thus, in Figs. 6 and 7, stopper 26 is in "port blanking position"; and it is also in "port blanking position" when its leading edge is at L' in Fig. 2. The stopper is to be considered as out of port blanking position whenever it does not extend completely across port 30.

The stopper 26 is to be considered in "full overlap position" when cavity mouth 38, and the material-face 51 exposed thereat fully encircle port 30 and are fully overlapped by face 22 (whether or not the port and mouth are exactly concentric) that is, when the annular channel U encircles port 30 and is fully blanked by face 22. The stopper is in "full overlap position" in Figs. 6 and 7 and is out of "full overlap position" in Fig. 2. Thus, when the stopper is in the position of Figs. 6 and 7 it is in both "port blanking position" and "full overlap position" (the "full overlap position" being a special type of "port blanking position"), while, when the leading edge of the stopper is at position L' in Fig. 2, the stopper is in "port blanking position" but is out of "full overlap position."

Now let us assume that the valve is in the fully closed condition of Fig. 7 and that passageway 28 represents the inlet side of the valve with the controlled fluid standing under pressure therein. Passageways 28 and 27 then respectively represent relatively high and low pressure zones. Due to by-pass 29, the fluid within valve chamber 20 is under the same pressure as is the fluid within passageway 28 and therefore the chamber may, in the cited instance, be considered as a part of the high pressure zone.

As the stopper 26 is moved to the right towards open position, a portion of mouth 38 traverses port 30, and the material 40 within that portion of the mouth is thus exposed at port 30 to low pressure zone 27 but, until the stopper has been moved to an extent which opens the mouth to chamber 20 at a point beyond shoulder 90, face 22 acts as a barrier to prevent exposure of the remaining portion of the mouth to high pressure zone 20, 28. On the other hand, before the stopper has been moved sufficiently to expose mouth 38 to chamber 20 at a point beyond shoulder 90, the port-traversing portion of the mouth will have been drawn beneath face 22 (Fig. 2) so said portion is no longer exposed to port 30 or to low pressure zone 27. Similarly, as the valve is re-closed, the portion of mouth 38 which, in the full open condition of the valve, lies to the right of shoulder 90, is blanked by face 22 and thus put out of communication with high pressure zone 20 before the leading portion of the mouth starts to traverse port 30 and low pressure zone 27. Thus, though at times one portion of mouth 38 is exposed to a high pressure zone and, at times, another portion of the mouth is exposed to a low pressure zone, the specified arrangement of parts is such that, at all times when the stopper 26 is out of "port blanking" position, the material 40 is unexposable simultaneously to port 30 and low pressure zone 27 on the one hand, and to high pressure zone 20, 28 on the other hand.

Accordingly, the plastic material 40 at mouth 38 is never exposed simultaneously to differential pressure conditions which would otherwise cause the material to be harmfully extruded through the mouth, or, expressed otherwise, to be dislodged from cavity 36 in a manner to interfere with continued, full-efficiency operation of the valve.

It will be seen that the same general conditions prevail if passage 27 represents the inlet side of the valve. Passageways 27 and 28 then respectively represent relatively high and low pressure zones; chamber 20 also being considered as a low pressure zone. As the stopper 26 is moved to the right from the position of Fig. 7, a portion of mouth 38 traverses port 30, and the material 40 within that portion of the mouth is thus exposed at port 30 to high pressure zone 27, but until the stopper has moved to an extent which opens the mouth to low pressure chamber 20 at a point beyond shoulder 90, face 22 acts as a barrier to prevent exposure of the remaining portion of the mouth to low pressure zone 20, 28. On the other hand, before the stopper has been moved sufficiently to expose mouth 38 to low pressure chamber 20 at a point beyond shoulder 90, the port-traversing portion of the mouth will have been blanked by face 22 (Fig. 2) so said portion is no longer exposed to port 30 or high pressure zone 27.

Occasionally, valves are installed in systems where, after the stopper has been retracted to a position in which the port, such as 30, is partially open, it is positively known that the pressure drop through the valve is insufficient in value to have harmful displacement effect on the sealing plastic. In such situations, it is only necessary to insure that the plastic be unexposable simultaneously to high and low pressure zones at such times as the value of the differential is of relatively high order.

Such a situation is illustrated in Fig. 9, where it is assumed that the fluid pressure conditions are known to be such that, when the valve is in the partially open condition illustrated, the value of the pressure differential between zone 27 and zone 20, 28 is insufficient to affect material 40 disadvantageously. Accordingly, surface 22' need not extend proportionately as far to the right as does surface 22 in Fig. 2. As indicated in Fig. 9, when the left hand portion of mouth 38 is exposed to zone 27 at the right hand edge of port 30, the right hand portion of mouth 38 lies to the right of shoulder 90', and therefore the material 40 is simultaneously exposed to zones 27 and 20, 28 during a limited part of the stopper stroke when said stopper is out of "port blanking" position, it being remembered that in the illustrated case, the pressure differential existing during this part of the stroke is insufficient to cause dislodgement of material 40.

However, as soon as stopper 26 has been moved to the left sufficiently to create a pressure differential of slightly higher order, the right hand portion of mouth 38 is blanked by wall 22', and thereafter, throughout all periods during which the pressure differential is of or above that higher order, the material 40 is constantly unexposable simultaneously to the two zones. The arrangement illustrated in Fig. 9 lies within the scope of certain of my broader claims, but the preferred arrangement is that of Fig. 2, since this allows for universal installation, regardless as to whether or not the differential pressure is, during certain stages of valve operation, below a critical value.

I will now describe a number of variational embodiments of my invention. Such of the elements as are substantially identical to corresponding, previously described elements, will be given the same reference numerals, while certain of the elements which are similar only in certain respects, will be given the same reference numerals plus an appropriate subscript. Such of the previous description of the elements, their operation and cooperation, as will apply to the counterparts of those elements in the variational embodiments will not, in all cases, be repeated, it being understood that the earlier description will then apply. It is also to be noted that the features described in connection with Figs. 8 and 9 should be considered as applicable to each of the variational embodiments to be described.

I will first refer to the variational embodiment illustrated in Figs. 10 to 16, inclusive. Except for certain differences in the arrangement and application of the sealing plastic, the device and its operative features are similar to those previously described. However, in the Fig. 10 embodiments, part of the plastic sealing medium, which medium has the same characteristics as those ascribed to medium 40, is contained in a cavity in the body member of the valve and the remainder is contained in a stopper cavity. While either part or both parts of the sealing medium may be complete annuli adapted to encircle port 30 when the valve is fully closed, the illustrated embodiment is a simplification in which the mouth-portion of each "part" of the plastic body is in the form of an arc of a little greater than 180° angular extent, the two mouths having portions which register when the stopper is in "full-overlap" position and thus combine to form a continuous, annular mouth about port 30.

Figure 10:
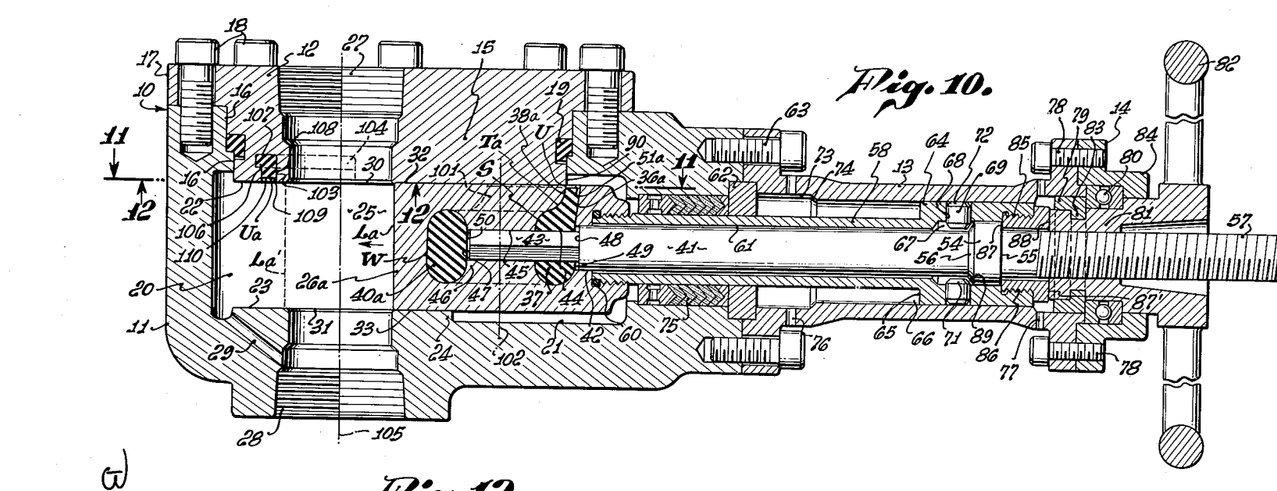
Fig. 10 is a view similar, in aspect, to Fig. 2 but showing a variational embodiment of the invention.
Figure 11:
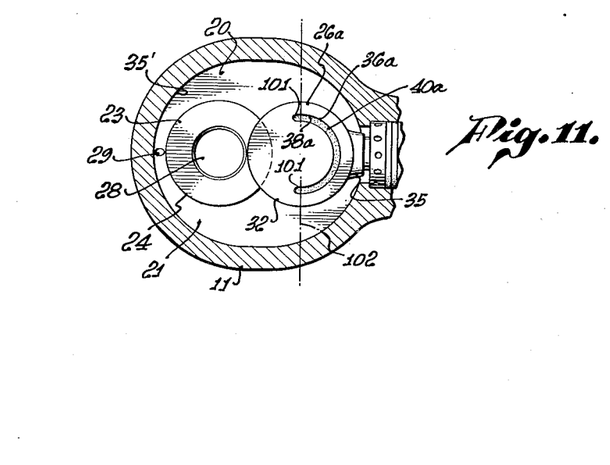
Fig. 11 is a reduced scale, fragmentary section on line 11—11 of Fig. 10.
Figure 12:
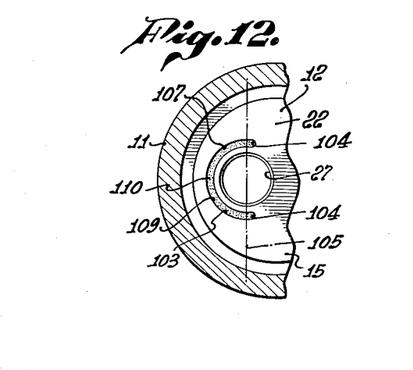
Fig. 12 is a reduced scale, fragmentary section on line 12—12 of Fig. 10.

Referring first to Figs. 10, 11 and 12, it will be seen that stopper 26a has an arcuate cavity 36a which communicates through throat Ta with an arcuate groove or mouth 38a opening to the upper face 32 of the stopper. Mouth-arc 38a is concentric with the stopper spool, is of an angular extent of a little greater than 180°, and its end-portions 101 extend to the left (Fig. 11) beyond that center line 102 of stopper 26a which is normal to the direction of stopper-movement.

Within cavity 36a is the coherent body 40a of internally tenacious plastic material, which extends upwardly through throat Ta and into mouth or channel 38a. The upper surface 51a of the plastic may bear any of the relationships with respect to spool-face 32 that were specified in connection with Figs. 1 to 9, but it is here shown as being spaced slightly below that face, developing a gap U when the plastic is in the unpressurized condition of Fig. 10.

Sunk in face 22 of cover 12, and thus, in effect, of body 10, is an arcuate, downwardly opening groove 103. The arc of groove 103 is concentric with port 30, is of the same radius and angular extent as arc 38a, and its end portions 104 extend to the right (Fig. 12) beyond that axis 105 of port 30 which is normal to the direction of travel of stopper 26a.

Groove 103 is preferably arcuately undercut at 106 to form a key for the arcuate body 107 of plastic material contained therein, which material has the same characteristics as plastic 40a. Portion 108 of the groove may be considered as a throat, while the opening of the groove to face 22 may be considered as mouth 109, the arcuate face of plastic which is exposed at mouth 109 being indicated at 110. Face 110 may have any of the relationships with respect to face 22 that were specified in connection with faces 51 and 32, but it is illustrated as spaced slightly above face 22 to develop a gap Ua, the functions of gaps U and Ua being the same as those discussed in connection with gap U of the embodiment of Fig. 2. As was said in connection with that embodiment, the plastic 40a and 107 may be in whole or in part bonded to the defining walls of the grooves which contain it.

When hand wheel 82 is first rtated right-handedly, stopper 26a is moved to the position of Figs. 13 and 14 without effectively pressurizing plastic 40a, just as was described in connection with the shifting of stopper 26 from the position of Fig. 2 to that of Fig. 6. Now, however, the ends of arcuate mouths 38a and 109 are in register through the provision of overlapping end-portions 101 and 104; the two arcuate channels, and the plastic contained therein, thus complementing one another to form an annulus completely surrounding port 30, though plastic face 51a is still spaced from body-face 22, and plastic face 110 is still spaced from stopper-face 32.

Figure 15:
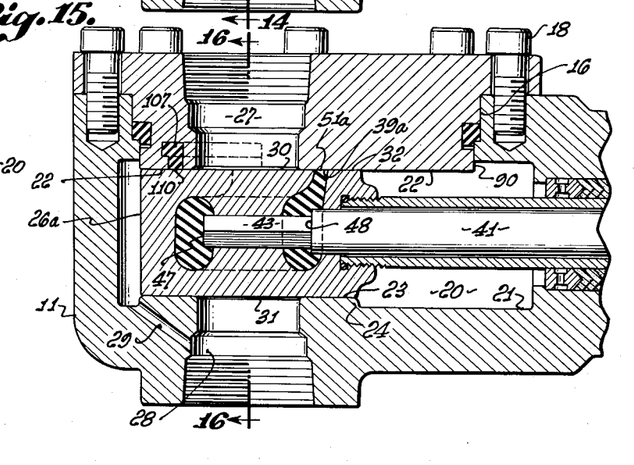
Fig. 15 is a view similar to Fig. 13 but showing the parts in changed positions.
Figure 16:
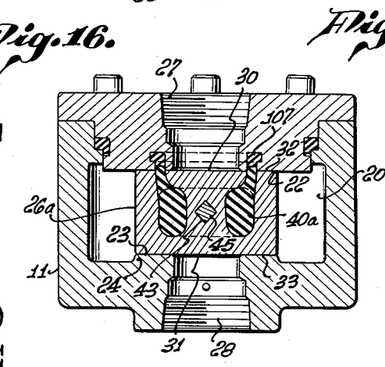
Fig. 16 is a reduced scale, fragmentary section on line 16—16 of Fig. 15.

When hand wheel 82 is further rotated to project plunger 40 and its extension 43 into plastic 40a, as described in connection with the shifting of stopper 26 from the position of Fig. 6 to that of Fig. 7, the various elements will assume the positions of Figs. 15 and 16. The pressurizing of plastic 40a by pressure-faces 47 and 48 of rod 41, first extrudes plastic 40a in a manner to close gap U in stopper 26a and to close the double gap U, Ua, where the mouths 38a and 109 overlap one another at 101, 104 (Fig. 16). Thereupon, further pressurizing of stopper-plastic 40a is effective to pressurize body-member-plastic 107 and to cause the full closure of gap Ua. The final pressurizing of plastic 40a sealingly engages plastic face 51a with sealing area 39a of body-face 22, and, as transmitted through mutually overlapping extensions 101, 104 to plastic 107, sealingly engages plastic face 110 with stopper face 32. At 101, 104, of course, the plastic faces 51a and 110 are sealingly engaged with one another. Thus, in Figs. 15 and 16, the parts have been put in such condition that there is a complete annular seal about port 30 which will defy leakage up to any pressure which the body member will stand.

Figure 13:
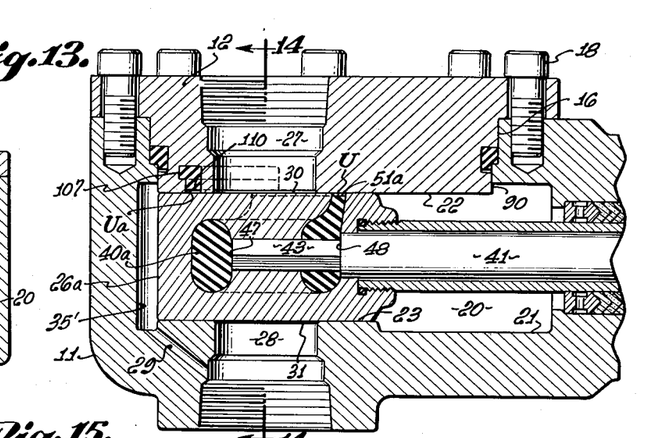
Fig. 13 is a fragmentary section similar to a portion of Fig. 10, but showing the parts in changed positions.
Figure 14:
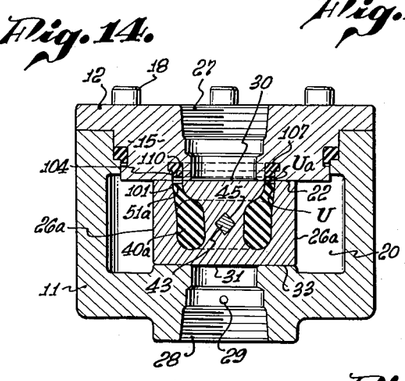
Fig. 14 is a reduced scale, fragmentary section on line 14—14 of Fig. 13.

Upon rotating hand wheel 82 reversely, plunger 40 is first retracted to de-pressurize plastic 40a and 107 so it may return to the condition of Figs. 13 and 14 (as described in connection with Fig. 6), the stopper still being unretracted. Further retraction of plunger 40 restores the parts to the condition of Fig. 10, it being noted that during the retractive movement of the stopper, plastic faces 51a and 110 are not engaged with opposed, relatively moving parts and therefore there is no wear on the plastic nor does the plastic offer frictional resistance to the bodily movement of the stopper.

It will be noted that at no time in the movement of, nor in any position of stopper 26a does mouth 38a or plastic face 51a traverse or extend into communication with port 30 or passageway 27, so there is no possibility of extruding plastic 40a into said port or passageway. When stopper 26a is in any position other than that in which a portion of mouth 38a lies to the right of housing shoulder 90 (Fig. 10, for instance) said mouth and plastic face 51a therein, are completely blanked by housing surface 22, and, while thus completely blanked, they are not, of course, effectively exposed to the pressure zones represented by passageways 27, 28 or chamber 20. On the other hand, when a portion of the mouth 38a and a portion of plastic face 51a are exposed to the pressure zone represented by chamber 20 (as in Fig. 10) all other portions of the mouth and face are blanked by housing wall 22 and are thus out of effective communication with any zone having a pressure differing from that of chamber 20.

As to the mouth 109 of body-groove 103 and exposed plastic face 110, they are always either blanked by stopper 26a, and therefore in effective communication with none of the specified pressure zones, or they are exposed either in full or in part to the pressure zone represented by chamber 20 but to no zone having a pressure differing from that of chamber 20.

Thus, it will be seen the structure is such that at no stage of stopper movement or repose (and therefore, inclusively, at no time when the stopper is out of "port-blanking" position) is the plastic in either the body member or stopper exposable simultaneously to differential fluid pressure zones (regardless of the direction of fluid-flow through the valve when it is open) in a manner tending to allow or cause the displacement of the plastic into a low pressure zone by reason of a fluid pressure differential.

I will now describe the embodiment disclosed in Figs. 17 through 21, wherein the plastic sealing medium is entirely contained within a body-groove, though the pressurizing of that medium is accomplished through selective stopper-movement.

Sunk in face 22 of cover 12b, and thus, in effect, of body 10b, is a circular, downwardly opening annular groove or channel 103b which is concentric with passageway 27 and its orifice 30. The groove or cavity 103b is preferably annularly undercut to form a key-portion 106b of the annular, coherent body 107b of internally tenacious plastic material, which may, if desired, be molded within the cavity. As described in connection with the other embodiments, plastic 107b may, if desired, be bonded in whole or in part to the defining walls of cavity 103b.

Portion 108b of the groove 103b may be considered as a throat, while the opening of the groove to face 22 may be considered as mouth 109b, the annular face of plastic which is exposed at mouth 109b being indicated at 110b. Face 110b may have any of the relationships with respect to face 22 that were specified in connection with face 51, but it is illustrated as spaced slightly above face 22 to develop a gap U$b$, the functions of this gap being the same as those discussed in connection with the gap U in the embodiment of Fig. 2.

Cut in the lower face 22 of cover 12$b$ is a radial groove 113 (Figs. 17 and 19) which opens at its opposite ends to channel 103$b$ and the peripheral face of the cover. Plastic annulus 107$b$ has an integral radial extension 114 projecting into and filling the near end of groove 113, the balance of said groove being occupied by a rigid, arcuate, pressure block 115, of metal or the like, which block is limitedly slidable through the groove under certain conditions of operation, as will be described. The block is confined vertically between groove-wall 116 and the upper face 32 of stopper 26$b$, while its outward radial movement is limited by body-shoulder 117. However, it will be noted that a considerable portion of the outer end face 115' is exposed to chamber 20. Groove 113 is axially parallel to stopper-stem 118 by which the stopper 26$b$ is reciprocated in the manner to be described.

In order to hold the block 117 in sub-assembly with cover 12$b$ while the latter is being lowered into assembly with the main-body casing 11$b$, the block is preferably socketed at 119 to receive a keying stud 120 which is integral with plastic extension 114.

The flat stopper or gate 26$b$ is of the shape clearly shown in Figs. 17 and 18, being adapted for horizontal reciprocation through way 25 in a manner to traverse ports 30 and 31 and bearing the same relationship to faces 22 and 23 as was described in connection with stopper 26 and faces 22, 23 of the Fig. 2 embodiment.

Extending axially through stopper 26$b$ is a bore 121 which is threaded at 122 to take the threads of operating stem 118. An upstanding lug or heel 123 is provided on stopper 26$b$, said lug being in alinement with pressure block 115, but, in the position of Fig. 17, being considerably spaced therefrom.

Stem 118 is supported for rotation and held against end play by the combination bearing and seal rings 124 carried in body-casting 11$b$ at opposite sides of stem-collar 125. Rings 124 may, for instance, be in the nature of "Graphitar." Bonnet 126, bolted to casting 11$b$ and gasketed at 127, carries a shaft bearing 128, which bearing is held in place by cap-nut 129, the latter serving, through bearing 128, to retain the chevron packing 130. The fitting 131 is provided to allow pressurized lubricant to be supplied to shaft-bearings 124.

Figure 17:
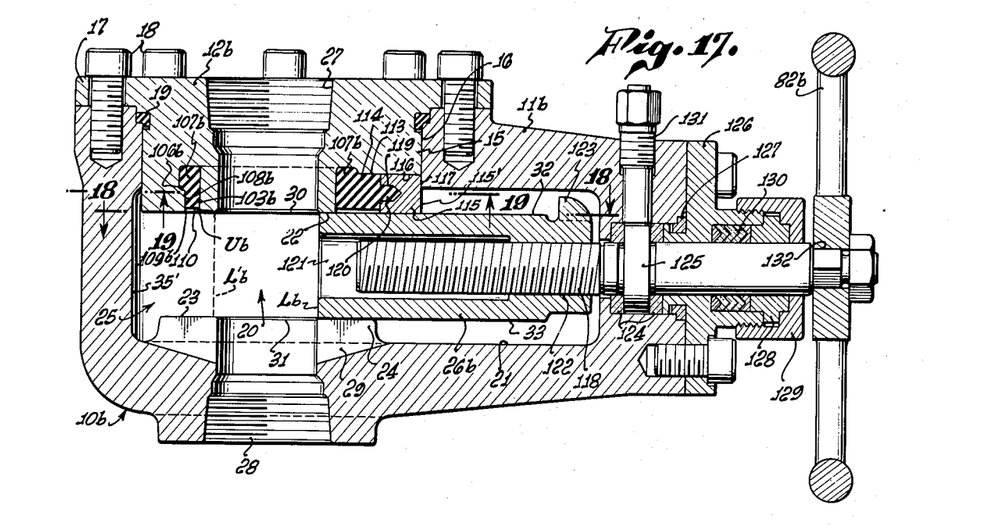
Fig. 17 is a view similar, in aspect, to Fig. 2, but showing another variational embodiment of the invention.
Figure 18:
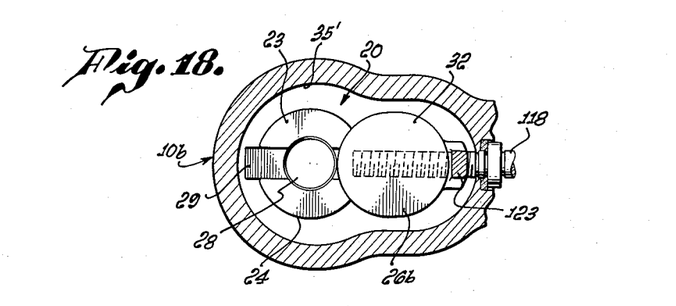
Fig. 18 is a reduced scale, fragmentary section on line 18—18 of Fig. 17.
Figure 19:
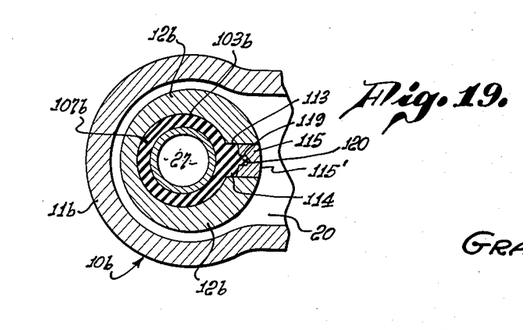
Fig. 19 is a reduced scale, fragmentary section on line 19—19 of Fig. 17.

Stem 118 is squared at 132 to take hand wheel 82$b$, whereby the stem is rotated to cause horizontal reciprocation of stopper 26$b$, Fig. 17 illustrating the position to which the stopper is retracted in order to provide a full-open valve.

Figure 20:
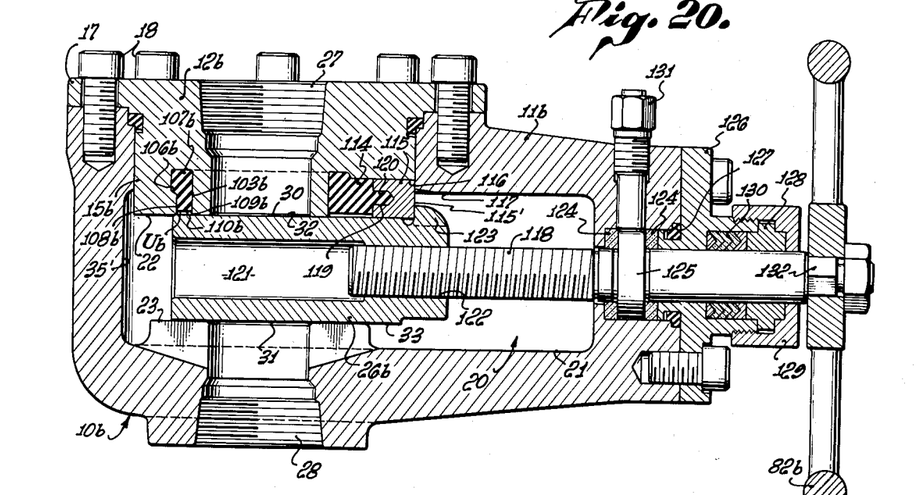
Fig. 20 is a fragmentary view similar to Fig. 17, but showing parts of the valve in changed position.

In order to close the valve, stem 118 is first rotated to move spool 26$b$ from the position of Fig. 17 to that of Fig. 20, the leading edge L$b$ of the stopper having traversed orifice 30 during its passage and the stopper having moved successively to positions of "port blanking" and "full overlap," though plastic 107 is still unpressurized since lug 123 has just come into engagement with face 115' of pressure-block 115.

Upon continued rotation of stem 118, the stopper moves further to the left, lug 123 consequently moving pressure-block 115 in the same direction and pressurizing the plastic 107$b$. This has the effect of first extruding the plastic through throat 108$b$ to close gap U$b$ and then sealingly engaging plastic face 110$b$ with stopper-face 32 (Fig. 21), thus effecting a complete, annular seal about port 30, which prevents the possibility of leakage from flow-passage to flow-passage.

Upon rotating hand wheel 82$b$ reversely, the parts successively reach the positions of Figs. 20 and 17; the complete depressurizing of the plastic and its return to the condition of Figs. 20 and 17 occurring before there has been any appreciable bodily movement of the stopper. In any event, the bodily movement of the stopper necessary to impose or relieve the actual final sealing pressure is negligible, since the plastic is to all intents and purposes incompressible. It will thus be seen that stopper-movement has little or no wearing effect on the plastic. Such wear as may occur or such losses of plastic as may result from minor extrusions into clearance spaces, are compensated by merely projecting the stopper further to the left during the valve-closing operation.

It will be noted that the plastic 107$b$ is so positioned that no part of it is exposed directly to passageway 27 and therefore, since the body stock defining the cavity 103$b$ is in the nature of a non-pressure-transmissive wall between the cavity and the passageway, there is no opportunity for the plastic to be extruded into said passageway when the latter has the characteristics of a low pressure zone, or for high pressure in said passageway being transmitted to said plastic at points inward of mouth 109$b$.

When stopper 26$b$ is in such position that its leading edge is at L'$b$ or in any position intermediate that position and the full line position of Fig. 17, those portions of mouth 109$b$ and face 110$b$ which, in general, lie to the left of L'$b$ will be directly exposed to the fluid pressure within chamber 20. The balance of mouth 109$b$ and face 110$b$ will be blanked by stopper 26$b$, but the fluid pressure of chamber 20 will be applied to the entire underside of the plastic annulus, including the blanked-off portion, since access to said blanked-off portion is given through gap U$b$. Face 115' of block 115 will also be exposed directly to the fluid pressure within chamber 20 and this pressure is transmitted to plastic body 107$b$ through plastic extension 114. Hence, the plastic body 107$b$ is, throughout, exposed to uniform fluid pressure, whether the pressure in chamber 20 be relatively high or relatively low.

Figure 21:
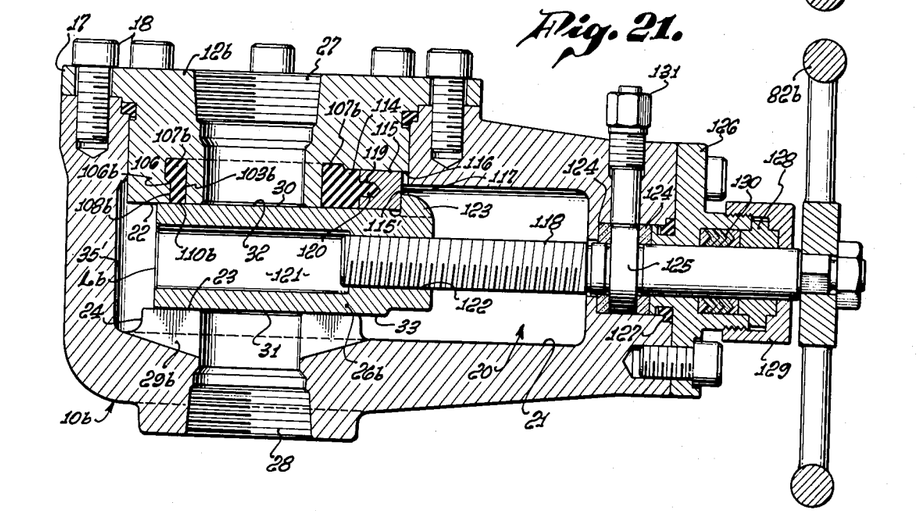
Fig. 21 is a view similar to Fig. 20, but showing the parts of the valve in still another position.

When the stopper 26$b$ is in the position of Figs. 20 or 21, the entire extents of mouth 109$b$ and face 110$b$ are blanked off and the plastic body 107$b$ is exposed only to the fluid pressure within chamber 20 as transmitted through block 115.

Thus, it will be seen that the structure is such that at no stage of stopper movement or repose (and therefore, inclusively, at no time when the stopper is out of "port blanking" position) is the plastic 107$b$ exposable simultaneously to differential fluid pressure zones (regardless of the direction of fluid-flow through the valve when it is open) in a manner tending to allow or cause the displacement of the plastic into a low pressure zone by reason of a fluid pressure differential.

Figures 22, 23, 24, 25, 26, 27:
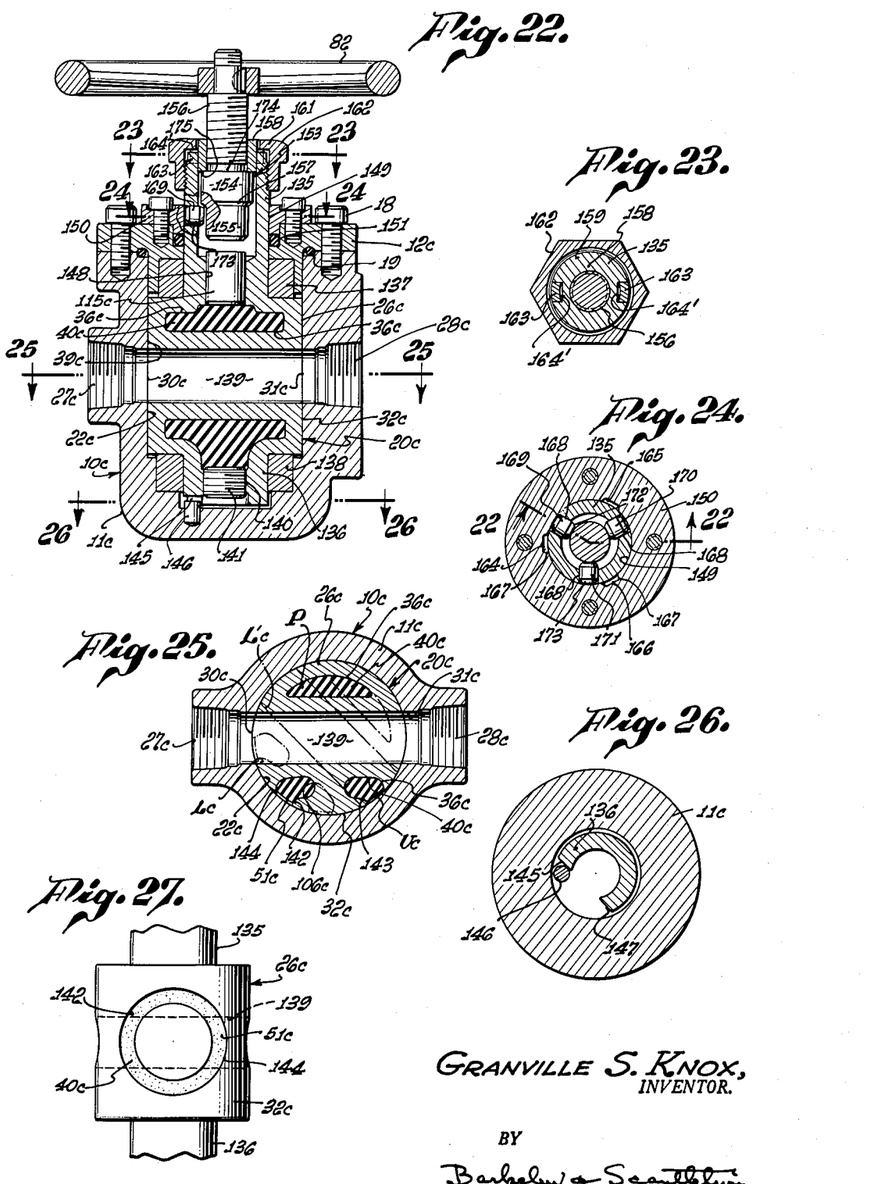
Fig. 22 is a medial, sectional view taken through a valve in which another embodiment of my invention is incorporated.
Fig. 23 is a detail section on line 23—23 of Fig. 22.
Fig. 24 is a detail section on line 24—24 of Fig. 22.
Fig. 25 is a section on line 25—25 of Fig. 22.
Fig. 26 is a section on line 26—26 of Fig. 22.
Fig. 27 is a detached side elevation of the valve plug or stopper illustrated in Fig. 22.
Figures 28, 29, 30:
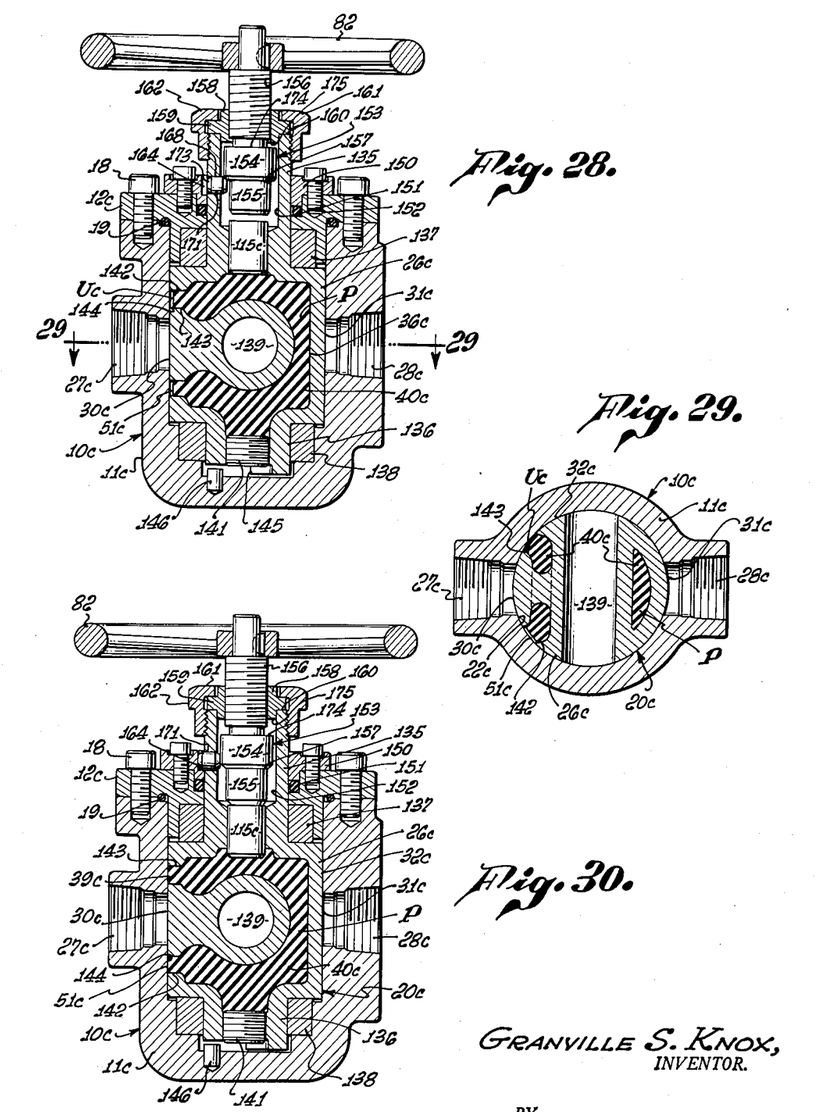
Fig. 28 is a view similar to Fig. 22, but showing the valve parts in changed positions.
Fig. 29 is a section on line 29—29 of Fig. 28.
Fig. 30 is a view similar to Fig. 28, but showing the valve in full-sealing condition.

I will now refer to the embodiment of my invention illustrated in Figs. 22 to 30, inclusive, wherein the valve stopper is in the nature of a rotatable plug. Valve body 10$c$ consists of main body portion 11$c$ and cap-ring 12$c$ gasketed at 19 and bolted together at 18. The internal, peripheral face 22$c$ of the body defines a cylindrical valve chamber 20$c$, to which the diametrically opposite, fluid-flow passages 27$c$ and 28$c$ open, as at orifices 30$c$ and 31$c$, respectively. Mounted for rotary oscillation within chamber 20$c$, and having nice working fit with the defining wall 22$c$ thereof, is the cylindrical, rotary plug or stopper 26$c$. The stopper has upper and lower axial necks 135 and 136, respectively, which have bearing in housing-supported rings 137 and 138, respectively, said rings holding the stopper against end play. Stopper 26$c$ has a transverse, through-bore or passageway 139 which, when the valve is open, as in Figs. 22 and 25, is axially alined with and connects passageways 27$c$ and 28$c$, and, when the valve is closed, as in Figs. 29 and 30, is blanked by the defining wall 22$c$ of chamber 20$c$.

Stopper 26$c$ is cored out to provide a cavity 36$c$, the core-opening 140 being permanently sealed, as by plug 141, after the casting operation is completed. The wall of stopper 26$c$ is cut through to cavity 36$c$ in a manner to provide an annular channel 142 having an annular throat portion 143 and an annular mouth 144, the inside diameter of the mouth being greater than the diameter of orifice 30c.

Within cavity 36c is the coherent body 40c of plastic, preferably having the same characteristics as plastic 40, which extends through throat 143 into mouth 144. The outer surface 51c of the plastic, where it is exposed at mouth 144, may bear any of the relationships with respect to the peripheral face 32c of stopper 26c that were specified in connection with Figs. 1 and 9, but it is here shown as being spaced slightly below that face to develop a gap Uc, the functions of this gap being the same as those discussed in connection with the gap U of the Fig. 2 embodiment. That portion of plastic 40c, which fills the undercut 106c (Fig. 25) forms a "key" to hold the plastic against bodily dislodgement from cavity 36c, and the plastic may be molded in place within said cavity and may, if desired or necessary, be bonded to the stopper member, as by vulcanizing it in whole or in part to the cavity defining walls. The portion p of plastic body 40c which lies above passageway 139 in Fig. 25, also acts to hold the plastic against bodily dislodgement in the direction of mouth 144.

When the valve is fully open, as in Figs. 22 and 25, stop-shoulder 145 on stopper-neck 136 engages the body-carried pin 146 (Fig. 26) to prevent further counterclockwise movement (Fig. 25) of stopper 26c, the pin being so positioned that it assures full alinement of passages 27c, 139 and 28c when the stopper is rotated to its limit of counterclockwise movement.

Clockwise rotation of stopper 26c from the position of Fig. 25 toward that of Fig. 29, is confined to about 90° of movement by the engagement of stopper shoulder 147 (Fig. 26) with the other side of pin 146. When the stopper is thus moved to the position of Figs. 29 and 28, passageway 139 is blanked at both ends by the body wall, while the stopper, itself, blanks port 30c. Mouth 144 then opposes annular sealing area 39c and is concentric with and fully encircles orifice 30c, though it is preferably annularly spaced from said orifice.

I will now describe the means for sequentially rotating stopper 26c and pressurizing plastic 40c. The bore 148 of stopper-neck 135 opens to the top of cavity 36c and confines, with sliding fit, the cylindrical pressure block 115c which engages the upwardly presented area of plastic 40c.

Neck 135 extends upwardly through the bore 149 of lock-ring 150 which is bolted to cap-ring 12c and is gasketed at 151. Neck 135 is counterbored at 152 to receive a plunger 153 operated by handwheel 82 and having a collar portion 154 between terminal portion 155 and threaded portion 156. The lower end of collar portion 154 is tapered to provide a cam shoulder 157. A threaded bushing 158 takes threaded portion 156 of the stem and has an annular external flange 159 (Fig. 28) adapted to be clamped between neck-shoulder 160 and the underside of flange 161 on retaining nut 162, which latter is threadably connected to neck 135. The clamping of flange 159 holds bushing 158 against axial play with respect to neck 135, while the interfit of tongues 163 and notches 164' (Fig. 23) on neck 135 and in flange 159, respectively, holds the bushing against rotation with respect to neck 135.

Opening to counterbore 149 of lock ring 150, and spaced 120° apart, are notches 164, 165 and 166 (Fig. 24) the vertically extending end walls 167 of the notches being angled to serve as cam shoulders, as will appear.

Neck 135 has radially extending bores or ways 168 (Fig. 24) which are spaced 120° apart and are adapted to confine, except against end-play, the three latching detents 169, 170 and 171, said detents being in the form of short cylinders having inner conical ends 172 and outer conical ends 173, which ends act as cam faces, as will appear. The ways 168 lie in the horizontal plane of notches 164, 165 and 166.

When the valve is fully open, as in Fig. 22, the upper end 174 of stem-collar 154 frictionally engages the downwardly facing shoulder 175 presented by the lower end of bushing 158, and the conical shoulder 157 of stem-collar 154 lies above detents 169 to 171. The detents are out of registration with notches 164 to 166, and their inner ends 172 project into counterbore 152.

It will be noted that in Fig. 22 the section is broken back in the area encompassing detent 169, the section within this area being taken on line 22—22 of Fig. 24. The defining wall of ring-bore 149 positively presents outward radial movement of detents 169 to 171 when the valve is in the condition of Figs. 22 and 24.

It will also be noted that, in the position of Fig. 22, the lower end 155 of stem 153 is vertically spaced from pressure block 115c, but this does not preclude the provision of block 115c as an integral part of the stem—in which event, in the position of Fig. 22, the lower end of the pressure block would be vertically spaced from plastic 40c. The advantage of fabricating block 115c separately from stem 153 lies in the fact that when the stem is rotated while block 115c is in pressural engagement with plastic 40c (as in Fig. 30) said block need not rotate with respect to that plastic.

When hand wheel 82 is rotated in a direction to depress stem 153 from the position of Fig. 22, the first effect is to engage collar shoulder 157 with ends 172 of detents 169 to 171. Thereafter, downward movement of stem 153 tends to cam detents 169 to 171 radially outward, but the angles of the engaged cam faces and the frictional forces involved are such that the downward pressure of the collar slightly "cocks" the detents within their ways instead of shifting them radially outward. This "cocking" of the detents frictionally binds the neck 135 and stem 153 against relative rotation, it following that subsequent clockwise rotation of the stem cannot, at this time, thread-feed the stem further downwardly, but, instead, such rotation causes coincident bodily rotation of stopper 26c. Such bodily rotation is continued until stopper shoulder 147 engages stop pin 146, putting the stopper in the position of Figs. 28 and 29. It will be seen that, in this position, plastic 40c has not yet been pressurized and that gap Uc still exists, though the annular mouth 144 and the annular plastic surface 51c are now concentric with the blanked orifice 30c, and orifice 31c is blanked by the opposite side of stopper 26c.

Stem terminal 155 is still spaced above pressure block 115c, but the 90° clockwise rotation of stopper 26c which has been allowed by the angular spacing between stop shoulders 145 and 147 (Fig. 26) has brought detents 169, 170 and 171 into radial registration with neck-notches 165, 166 and 164, respectively. With stop shoulder 147 and pin 146 positively preventing further clockwise rotation of the stopper, a continued clockwise rotation of stem 153 threads that stem downwardly through bushing 158, cam shoulder 157 now being effective against detent ends 172 to overcome the frictional resistance of the detents to endwise movement and thus thrusting the detents radially outward into notches 164 to 166 and clearing the path of the descending stem-collar 154.

After stem terminal 155 engages pressure block 115c, continued depression of stem 153 by operation of wheel 82 plunges block 115c into the plastic body 40c, first causing the plastic to flow through throat 143 to engage plastic face 51c with sealing area 39c and then pressurizing the plastic to form a tight, annular, plastic seal about orifice 30c (Fig. 30).

When it is desired to re-open the valve hand wheel 82 is rotated reversely or left-handedly. Since stem collar 154 is now positively holding the latching detents 169 to 171 in ring-notches 165, 166 and 164, said detents act in effect, to hold the stopper 26c against bodily rotation, and the stem is threadedly retracted to relieve the pressure on block 115c and hence on plastic 40c. By the time the stem reaches the position of Fig. 28, the pressure on plastic 40c is entirely relieved and, due to its resilient property, the plastic returns to the position of Figs. 22 and 25, thus re-developing gap Uc and entirely clearing plastic face 51c from the cylindrical defining wall 22c of chamber 20c.

However, at this stage in the opening operation the detents 169 to 171 are still at their positions of extreme radial projection, as in Fig. 30, though stem 153 is in the position of Fig. 28 with cam shoulder 157 just above detent cams 172.

Continued counter clockwise rotation of stem 153 engages collar shoulder 174 with bushing shoulder 175, preventing further relative rotation between the stem and stopper 26c. Accordingly, subsequent counter clockwise rotation of the stem, with shoulders 174, 175 "jambed," bodily rotates stopper 26c to the open position of Fig. 22, the cam shoulders 167 of notches 164 to 166 coacting with cam-ends 173 of detents 169 to 171 to thrust said detents radially inward during the first stage of such rotation. The described camming of the detents accomplishes the "unlatching" of the stopper from ring 150 (and thus, in effect, from body 10c) to permit relative rotation therebetween, and also restores the detents to the positions of Fig. 22 so they may, in effect, initially "latch" the stem 153 to stopper 26c, as previously described, during a subsequent valve-closing operation.

It will be noted that throughout rotational movement of stopper 26c to or from valve-closing position, plastic face 51c is entirely clear of body member face 22c and therefore is not exposed to wear that would otherwise occur.

Stopper 26c is to be considered as in "port blanking position" whenever it extends completely across port 30c, irrespective of the extent to which its leading edge Lc overlaps face 22c at the "far" side (the upper side in Fig. 25) of port 30c. Thus, in Figs. 28, 29 and 30, stopper 26c is in "port blanking position"; and it is also in "port blanking position" when its leading edge is at L'c in Fig. 25. The stopper is to be considered as out of port blanking position whenever bore 139 is in communication, full or partial, with port 30c.

Stopper 26c is to be considered as in "full overlap position" when cavity mouth 144 and plastic face 51c fully encircle port 30c and are fully overlapped by face 22c, whether or not the port and mouth are exactly concentric. The stopper is in "full overlap position" in Figs. 28, 29 and 30 and is out of that position in Figs. 22 and 25, including the dotted line position of Fig. 25. Thus, when the stopper is in the positions of Figs. 28, 29 and 30 it is in both "port blanking position" and "full overlap position" (the "full overlap position" being a special type of "port blanking position") while, when the stopper is in the dotted line position of Fig. 25, it is in "port blanking position" but is not in "full overlap position."

It will be seen that at no stage in the operation of the valve is the plastic body 40c exposed to the pressure zone represented by passageway 28c. When stopper 26c is rotated to and from open position there are periods during which a portion of plastic face 51c is exposed to the pressure zone represented by passageway 27c, but at such periods the remaining portion of said face is blanked by body-face 22c. When the stopper is in full overlap position or is in a fully open position, face 51c is exposed to neither zone 28c nor 27c.

Thus, it will be seen that the structure is such that at no stage of stopper movement or repose (and therefore, inclusively, at no time when the stopper is out of port blanking position) is the plastic 40c at mouth 144 exposable simultaneously to differential fluid pressure zones (regardless of the direction of fluid-flow through the valve when it is open) in a manner tending to allow or cause the displacement of the plastic into a low pressure zone by reason of fluid pressure differential.

In connection with all the illustrated embodiments of the invention, it will be seen that the pastic sealing medium is so protected by the surrounding metal structure that, at no stage of valve operation or rest, is it exposed to wear by the jetting action of the fluid.

As a further feature of all embodiments of the invention, it is to be noted that the area of the plastic to which the pressure is directly applied by actuating the valve stem is kept relatively small. This is of importance particularly when the fluid pressure through the valve is relatively high, for, to be effective, the pressure per square inch established in the plastic by the pressurizing means must be greater than the pressure per square inch of the valved fluid. With a given fluid pressure, the smaller the area of pressure application, the less is the manually applied force required to establish the preponderant plastic pressure. By reducing this area to a reasonable minimum and by securing sufficient mechanical advantage through the stem-threads and hand wheel, it is possible to reduce the manually applied force, necessary to seal the valve against high fluid pressures, to a value well within the normal strength capacity of operators without unduly reducing the extent of travel of the stopper per revolution of the hand wheel. In the illustrated embodiments of the invention, these results have been attained by reducing the areas of pressure application (to the plastic) to relatively small fractions of the transverse cross-sectional areas of the respective stoppers.

While I have shown and described preferred embodiments of my invention, it will be understood various changes in design, structure and arrangement may be made without departing from the spirit and scope of the appended claims.

I claim:

1. In a valve, a body member having spaced-apart, opposed faces defining, in part, a valve chamber, there being a fluid flow port in each of said faces and opening to the chamber, there being a cavity sunk in one of said body faces and having an open mouth encircling the port in said one face, a non-pressure-transmissive wall between the cavity and said port in said one face and separating said port in said one face from pressural communication with the cavity below the mouth, a valve stopper member disposed between said faces and movable to and from a position blanking said port in said one face and fully overlapping the mouth of the cavity, a coherent body of extrudable plastic material within the cavity, a displacement member movably mounted in the body member and defining, in part, a wall of said cavity, and means for moving the displacement member inwardly and effectively operable only when the stopper member is in said position and thereby pressurizing said material in a manner pressurally and sealingly engaging said material, at the mouth of the cavity, with the opposing face of the stopper member, said material, when unpressurized, being entirely within the cavity.

2. A valve as characterized in claim 1, in which said stopper is a reciprocatable head, the displacement member is mounted for individual reciprocal movement in the body member, and the means for moving the displacement member includes a formation on the head and effectively engageable with said displacement member only when the stopper is moved to a position fully overlapping said mouth.

3. A valve as characterized in claim 1, in which the plastic material is resilient and in which the surface of the plastic material exposed at said mouth is spaced below said one face when the material is unpressurized.

4. A valve as characterized in claim 3, in which the plastic material is bonded, at least in part, to a cavity defining wall.

5. A valve as characterized in claim 1, in which said displacement member is a block slidably mounted in the body member for movement individually with respect to the stopper member.

6. A valve as characterized in claim 5, in which said block is slidable radially with respect to said one port.

7. A valve as characterized in claim 5, in which said stopper is a reciprocable head, and in which the means for moving the displacement member includes a formation on the head and effectively engageable with said block to slide it only when the stopper member is moved to a position fully overlapping said mouth.

8. In a valve, a body member having spaced-apart, opposed faces defining, in part, a valve chamber, there being fluid flow ports in said faces and opening to the chamber, there being a cavity sunk in one of the body faces and having an open mouth encircling the port in said one face, said chamber and the port in said one face representing, at times, two zones of differential pressure, there being a non-pressure-transmissive barrier between the cavity and mouth thereof on the one hand and the port in said one face on the other hand, a valve stopper member in the chamber between said faces and movable to and from a position blanking the port in said one face, in which latter position a face of the stopper member is in close opposition to said one face of the body member and, at times, closely overlaps the mouth of the cavity, a coherent body of extrudable plastic material which, when un-pressurized, lies entirely within the cavity, a movable body-wall-section defining a portion of a wall of said cavity, and means for moving the section and thereby pressurizing said material and effectively operable only when said mouth is fully overlapped by a face of the stopper member, whereby said material is extruded through said mouth to effect a pressural plastic seal against said stopper face and around said port, said barrier isolating the material in the cavity from simultaneous exposure to differential fluid pressures in said two zones.

9. In a valve, a body member having a valve chamber and fluid flow ports opening thereto, a valve stopper member in the chamber and movable to and from a position blanking at least one of the ports, in which position a face of the stopper member opposes the body-face defining said one port, there being a channel sunk in at least one of said opposed faces, said channel annularly surrounding said one port at least at times when the stopper member is in port-blanking position, a coherent body of resilient, extrudable plastic packing material in said channel and held against bodily displacement therefrom, the surface of the packing opposite the other of said opposed faces normally lying below said one of the opposed faces, and means for pressurizing said material and thereby causing a resilient extrusion of a portion of said material into sealing engagement with said other face, said means being effectively operable only when said stopper member is in port blanking position.

References Cited in the file of this patent

UNITED STATES PATENTS

| 581,358 | Mayer | Apr. 27, 1897 |
| 963,314 | Nolan | July 5, 1910 |
| 976,489 | Nolan | Nov. 22, 1910 |
| 2,194,260 | Allen | Mar. 19, 1940 |
| 2,229,871 | Penick | Jan. 28, 1941 |
| 2,238,357 | Allen | Apr. 15, 1941 |
| 2,318,882 | Nevill | May 11, 1943 |
| 2,331,557 | Lorehn | Oct. 12, 1943 |
| 2,510,442 | Volpin | June 6, 1950 |

FOREIGN PATENTS

| 486,624 | Germany | 1926 |